No. 747,486. PATENTED DEC. 22, 1903.
M. G. ROEDER.
GARMENT HOOK.
APPLICATION FILED DEC. 31, 1901.
NO MODEL.

Witnesses
T. P. Britt
Harry Ellis Chandler

Inventor
M. G. Roeder,
By Chandler & Chandler
Attorneys

No. 747,486. Patented December 22, 1903.

UNITED STATES PATENT OFFICE.

MARY G. ROEDER, OF MANCHESTER, MARYLAND.

GARMENT-HOOK.

SPECIFICATION forming part of Letters Patent No. 747,486, dated December 22, 1903.

Application filed December 31, 1901. Serial No. 87,963. (No model.)

*To all whom it may concern:*

Be it known that I, MARY G. ROEDER, a citizen of the United States, residing at Manchester, in the county of Carroll, State of Maryland, have invented certain new and useful Improvements in Garment-Hooks; and I do hereby declare the following to be a full, clear, and exact description of the invention, such as will enable others skilled in the art to which it appertains to make and use the same.

This invention relates to garment-hooks such as are used in connection with eyes; and it has for its object to provide a novel form of hook made of one piece and having attaching-eyes at the free end of the shank and at the base of the bill and a flexible retaining device or tongue so arranged as to prevent accidental disengagement of the hook, while permitting easy disengagement when desired.

Figure 1:
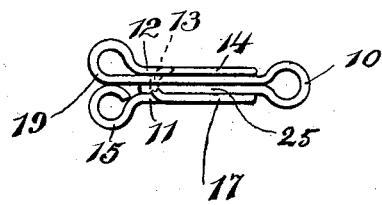
Figure 2:
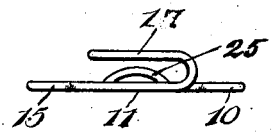

In the drawings forming a portion of this specification, and in which like numerals of reference indicate similar parts in both views, Figure 1 is a top plan view of the hook. Fig. 2 is a side elevation.

Referring now to the drawings, there is shown a hook formed from a single or continuous piece of wire and including a bill comprising the laterally-spaced members 14 and 17, having the connecting-bight portion 13, which is illustrated partly broken away to better show the arrangement of the sections of wire forming the shank of the hook. The shank of the hook comprises the sections 12 and 11, forming direct continuations of the wire from the sides 14 and 17, respectively, of the bill, and at the free end of the shank of the hook the members or sections 12 and 11 are bent outwardly and then inwardly to form eyes 19 and 15, respectively. The wire from the eye 19 is continued between members 11 and 12 beyond the bent end or bight of the bill of the hook, where it is bent to form an eye 10, which lies in the same plane with the eyes 15 and 19, the wire being continued from the eye 10 to lie against the inner side or face of the member or section 11 of the shank excepting at its central portion, which is curved upwardly into arc shape to project in the direction of the bill of the hook, as illustrated in Fig. 2, to form a hump or guard 25 for the hook. When the hook is engaged with an eye, the latter enters between the hump 25 and the bill of the hook and passes behind the hump 25, at which time the hump 25 is sprung downwardly, and owing to the presence of the eye 10 this action may be easily accomplished, for the reason that a torsional strain is applied to the eye. Under ordinary circumstances it is difficult with a short spring-retaining device to have it sufficiently yieldable without making it too light to be durable.

What is claimed is—

A hook, comprising a continuous wire bent upon itself to form spaced members and a connecting-bight, each of said spaced members being again bent upon itself to form another spaced member and a connecting-bight, each pair of spaced members lying in a common plane, the ends of the second-named spaced members being bent to form eyes, the wire forming one of said eyes being continued between the second-named spaced members and beyond the bights connecting the pairs of spaced members, where it is formed into an eye, the wire being carried backward in a common plane with the second pair of spaced members, and lying between and bent upwardly and then downwardly to form a hump, said wire terminating below the bight of the first pair of spaced members.

In testimony whereof I affix my signature in presence of two witnesses.

MARY G. ROEDER.

Witnesses:
   JACOB P. BALTOZER,
   IDA M. ROEDER.